Patented July 18, 1950

2,515,686

UNITED STATES PATENT OFFICE 2,515,686

PRODUCTION OF HALOACRYLIC COMPOUNDS

Carl E. Barnes, Belvidere, N. J., and William O. Ney, Jr., Easton, Pa., assignors to General Aniline & Film Corporation, New York, N. Y., a corporation of Delaware No Drawing. Application June 23, 1945, Serial No. 601,343

22 Claims. (Cl. 260—89.5)

This invention relates to the production of monomeric α-halogen substituted acrylic acid derivatives which are capable of yielding colorless polymers and to the color-free polymers from such derivatives. More particularly, the invention relates to the preparation of esters of α-chloracrylic acids, and especially methyl α-chloracrylate, which are capable of forming colorless polymers and to the color-free polymers obtained therefrom.

A great variety of α-halogen substituted acrylic compounds have been described in the art. The lower alkyl esters of α-halogen substituted acrylic acids are of particular interest since their polymers, particularly that of methyl α-chloracrylate, possess outstanding hardness and a high softening point coupled with thermoplastic properties which render them highly desirable in the field of plastics. To obtain the highest degree of hardness in the polymer, it is necessary to heat the polymer at a temperature of above 100° C. for a considerable length of time. Unfortunately, this heating results in the formation of a strong yellow discoloration in the polymer. The discoloration also occurs when the polymer is permitted to stand at room temperature for any considerable length of time. The exposure of the polymer to ultraviolet light also results in a strong discoloration. As a result of the tendency of the polymer to discolor, its use as a plastic material has been seriously limited. For this reason, it finds no practical use as a substitute for glass, particularly in the field of optical glass, such as lenses, prisms, windows, and windshields.

Attempts to obtain a polymer from the α-halogen substituted acrylic acid derivatives which is free from the tendency to discolor have heretofore proved to be unsuccessful. While various procedures for eliminating the tendency to discolor are proposed in the prior art, complete prevention of color is not obtained. Thus, in U. S. Patent 2,314,443, granted to Crawford, the discoloration of the polymer is stated to be due to the presence in the monomer of traces of so-called autooxidation products. In this patent, it is proposed to reduce the tendency to discolor by removing the autooxidation products by distilling the monomer in a vacuum in the absence of oxygen and then carrying out the polymerization under anaerobic conditions. Another proposal made in this patent is to destroy the autooxidation products by use of various reducing agents or compounds having a labile oxygen atom. However, a polymer free from the tendency to discolor is not obtained as is pointed out in the patent. Thus, while diminution in color formation is obtained, the best polymer obtained is still discolored as measured by the Lovibond Tintometer, having a color of red 0.3 Lovibond Unit and of yellow 0.8 Lovibond Unit.

In U. S. Patent 2,345,126, it is stated that while by practicing the process of U. S. Patent 2,314,443, considerable improvements are achieved in diminishing the extent of color formation in the polymer, complete suppression of the yellow color does not generally result. It is proposed in U. S. Patent 2,345,126 to further reduce this tendency to develop color. According to this patent, esters of α-haloacrylic acids which have been rendered substantially free from autooxidation products have added thereto a polyhydric alcohol or partial esters or ethers thereof as a stabilizer. In this patent, the least colored product obtained still has a total of 0.8 Lovibond Unit when heated for 16 hours at a temperature of 100 to 110° C. and 1.4 Lovibond Units when heated at the same temperature for 160 hours.

In U. S. Patent 2,247,790, granted to Strain et al., it is proposed to overcome the tendency to form color in the polymer by conducting the polymerization under substantially anhydrous conditions. However, while the patent states that a clear and water-white polymer is obtained, we have found that the polymer tends to discolor when heated for long periods of time or subjected to ultraviolet light.

It is an object of our invention to provide compositions of monomers of α-halogen substituted acrylic acid derivatives and more particularly the esters thereof, which yield polymers that are free from color and show no tendency to subsequently develop color when subjected to heat and/or ultraviolet light, or upon standing at ordinary room temperatures for extended periods of time.

It is a further object of our invention to provide polymers of α-halogen substituted acrylic acid derivatives and more particularly the esters thereof, which are color-free and free from the tendency to become discolored when subjected to heat and/or ultraviolet light or upon standing for extended periods of time.

According to copending U. S. application Serial No. 601,342, filed June 23, 1945, it has been determined that the cause of color formation in α-halogen substituted acrylic resins is due to the presence of oxalyl halide compounds, such as, for example, methyl oxalyl chloride in the case of methyl α-chloracrylate monomers. It is proposed therein to incorporate into the monomer any substance which in itself does not introduce color and which converts the oxalyl halide compound into a non-color-forming compound, thereby resulting in a monomer capable of forming a colorless polymer.

According to our invention, we have found esters of alcohols with inorganic acids to be effective agents for rendering inert the oxalyl halide present in the monomer and to result in a monomer capable of forming a colorless polymer.

According to our invention the above objects are obtained by incorporating small amounts of esters of alcohols with inorganic acids in the monomeric α-halogen substituted acrylic acid derivatives. The inorganic esters may be of monohydric alcohols or polyhydric alcohols. In the case of esters of polyhydric alcohols the esters may be whole or partial esters. Esters of monohydric alcohols with inorganic acids, such as, for example, sulfuric, sulfurous, hypochlorous, boric, and similar acids, are highly effective. As examples of such esters may be mentioned: diethyl sulfate, dialkyl and diaryl sulfites, such as, for example, diethyl sulfite, dipropyl sulfite, and diphenyl sulfite; propyl hypochlorite, and ethyl borate. As examples of esters of polyhydric alcohols may be mentioned: glycol sulfate and glycol sulfite. In another embodiment of the invention, partial esters of polyhydric alcohols with inorganic acids are also highly effective. Examples of such esters are ethylene chlorohydrin, ethylene bromohydrin, glycol sulfuric acid, glycerine chlorohydrin, and glycerine bromohydrin.

The esters may be incorporated in the monomeric α-haloacrylic acid derivative by simply dissolving them in the monomer before polymerization. The esters present the great advantage of being highly soluble in the monomer and reactive with the oxalyl halide compounds. Amounts as little as 0.1% based on the weight of the polymerizable compound are sufficient to prevent discoloration in the polymer. In general, a small amount ranging from 0.1% to 5% is effective. If desired, larger amounts may be utilized, the upper range being limited by the solubility of the ester in the monomer. Following the incorporation of the ester in the monomer, the resulting composition may then be polymerized by any suitable polymerization process.

We have found the lower alkyl sulfites, such as dimethyl, diethyl, and dipropyl sulfite, to be particularly effective for the purposes of our invention, because of their high solubility in the monomer and the great rapidity with which they react on the oxalyl halide present in the monomer.

Our invention results in many advantages. Thus, it is unnecessary to carry out the polymerization of the monomer in the absence of air. Nor is it necessary to take precautions against hydrolysis. Our process also makes it unnecessary to remove or destroy the autooxidation products in the monomer as proposed in U. S. Patents 2,314,443 and 2,345,126. It becomes also unnecessary to utilize a freshly distilled monomer. Rigid precautions need not be taken to prevent exposure of the monomer to air either during storage or polymerization. Nor is it necessary to dehydrate the monomer prior to distillation.

The monomers which we use may be obtained by usual methods. It is preferred to purify the monomer prior to polymerization by the ordinary fractional distillation methods to remove as much of the various impurities therein as possible.

Alpha-haloacrylic acids and their esters may, for example, be prepared by dehydrohalogenating α,α- or α,β-dihalopropionic acid or its esters. Thus, we prepare monomeric methyl α-chloracrylate by dehydrohalogenating methyl α,α- or α,β-dichloropropionate.

The addition of the ester is equally effective in preventing discoloration of the polymer whether produced by thermal- or photo-polymerization methods. In accordance with our invention, for example, massive cast pieces of polymers of esters of α-haloacrylic acids may be made which possess exceptional clarity, transparency, and freedom from color and maintain these properties even upon exposure to ultraviolet light and/or elevated temperatures for extended periods of time.

The quantity of ester incorporated in the monomer depends to some extent upon the atmospheric oxygen with which the monomer is likely to come into contact during the polymerization. The addition of larger amounts of the ester will allow the monomer to tolerate larger quantities of oxygen without the formation of color. Thus, for example, when larger amounts of an ester are added to the monomer, polymerzation may be carried out in vessels unsealed from the air and in which no especial effort is made to exclude air during the polymerization. Under these conditions, on the other hand, if the ester is omitted, a polymer is obtained which develops a strong yellow color upon heating and/or exposure to light or simply on standing under ordinary room conditions for an extended period of time. If the polymerization is carried out with more care in excluding air, correspondingly less of the ester need be added to the monomer.

Our invention is not only applicable for mass polymerization of α-haloacrylic acid compounds and their derivatives, but is also effective to prevent the formation of color in the polymer produced by other methods as, for example, in the case where the polymerization is carried out in the presence of solvents for the monomer alone, or for the monomer and polymer, or in granular or in emulsion polymerization methods. Thus, the addition of a small amount of the ester to the solution, or to the monomer in the case of granular polymerization, is highly effective for producing polymers which are free from the tendency to discolor.

The following examples are illustrative of our invention:

*Example 1*

Into a glass tube was placed 30 parts of freshly distilled methyl α-chloracrylate. To this was added .0015 part of benzoyl peroxide and 0.15 part of dipropyl sulfite. The tube was then sealed off and the mixture polymerized by heating for 16 hours at 25° C., then for 24 hours at 60° C., and finally for 24 hours at 115° C. The glass was then broken away. The polymer obtained was clear and colorless. A sample of methyl α-chloracrylate polymerized by the same method without the addition of diphopyl sulfite was found to have a distinct yellowish cast.

*Example 2*

50 parts of freshly distilled methyl α-chloracrylate were placed in a glass vessel and to this was added .005 part of benzoyl peroxide and 1 part of diethyl sulfite. Polymerization was carried out by heating the mixture for 24 hours at 35° C., then for 12 hours at 65° C., and finally for 24 hours at 115° C. The polymer obtained was clear and colorless. A sample of methyl α-chloracrylate polymerized by the same method without the addition of diethyl sulfite was found to have a distinct yellowish cast.

Example 3

100 parts of freshly distilled methyl α-chloracrylate were placed in a glass vessel and to this was added .01 part of benzoyl peroxide and 3 parts of glycol sulfate. Polymerization was carried out by heating the mixture for 24 hours at 35° C., then for 12 hours at 65° C., and finally for 24 hours at 115° C. The polymer obtained was clear and colorless. A sample of methyl α-chloracrylate polymerized by the same method without the addition of glycol sulfate was found to have a distinct yellowish cast.

Example 4

100 parts of freshly distilled methyl α-chloracrylate were placed in a glass vessel and to this was added .01 part of benzoyl peroxide and 2 parts of ethylene chlorohydrin. Polymerization was carried out by heating the mixture for 24 hours at 35° C., then for 12 hours at 65° C., and finally for 24 hours at 115° C. The polymer obtained was clear and colorless. A sample of methyl α-chloracrylate polymerized by the same method without the addition of ethylene chlorohydrin was found to have a distinct yellowish cast.

Example 5

50 parts of freshly distilled methyl α-chloracrylate were placed in a glass vessel and to this was added .005 part of benzoyl peroxide and 2 parts of glycol sulfite. Polymerization was carried out by heating the mixture for 24 hours at 25° C., then for 24 hours at 60° C., and finally for 24 hours at 120° C. The polymer obtained was clear and colorless. A sample of methyl α-chloracrylate polymerized by the same method without the addition of glycol sulfite was found to have a distinct yellowish cast.

While the invention has been described in the specific examples in connection with methyl α-chloracrylate, it is also applicable to other α-halogen substituted acrylic acid derivatives. By the term "α-halogen substituted acrylic acid derivatives," we intend to include the esters, amides, substituted amides, and nitriles of haloacrylic acids, as well as the acids. Among examples of such derivatives with which the present invention is effective in addition to that already disclosed in the examples may be mentioned: ethyl, propyl, butyl, phenyl, benzyl, cyclohexyl, allyl, and methallyl esters of α-chloro- and α-bromacrylic acids; α-bromo- and α-chloramides or N-substituted derivatives thereof, such as α-chloracrylamide, N-methyl α-chloracrylamide, and the corresponding α-bromo compounds; and α-chloracrylonitrile and the like. In general, our invention has been found effective to eliminate color formation in polymers prepared from polymerizable α-halogen substituted acrylic acid derivatives.

The temperature of polymerization may range from 20° C. or below to 120° C. or more, although the preferred range is approximately 35 to 65° C. The subsequent heating step in order to harden the polymer may range from 100 to 120° C. and the time from approximately 8 to 24 hours.

Either light for any suitable catalyst may be used to promote the polymerization in addition to benzoyl peroxide, such as, for example, succinyl peroxide, peracetic acid, and other peroxide- and oxygen-containing catalysts. The catalyst range may vary within approximately 0.01 to 0.5%.

Since it is apparent that the invention may be varied without departing from the spirit and scope thereof, it is to be understood that it is not limited to the specific embodiments given above, but only in accordance with the appended claims.

We claim:

1. A composition of matter adapted to be mass polymerized to a transparent, colorless, color-stable polymer, consisting essentially of a monomeric α-halogen substituted acrylic acid derivative, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymer but sufficient to prevent the formation of color in said polymer.

2. A composition of matter adapted to be mass polymerized to a transparent, colorless, color-stable polymer, consisting essentially of a monomeric α-halogen substituted acrylic acid ester, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymer, but sufficient to prevent the formation of color in said polymer.

3. A composition of matter adapted to be mass polymerized to a transparent, colorless, color-stable polymer, consisting essentially of a monomeric α-halogen substituted acrylic acid ester, having dissolved therein from 0.1 to 5% of a sulfite ester of a saturated monohydric alcohol of up to 3 carbon atoms, the amount of said sulfite ester being insufficient to materially affect the physical characteristics of the polymer, but sufficient to prevent the formation of color in said polymer.

4. A composition of matter adapted to be mass polymerized to a transparent, colorless, color-stable polymer, consisting essentially of a monomeric α-halogen substituted acrylic acid ester, having dissolved therein from 0.1 to 5% of a sulfite ester of a saturated polyhydric alcohol of up to 3 carbon atoms, the amount of said sulfite ester being insufficient to materially affect the physical characteristics of the polymer, but sufficient to prevent the formation of color in said polymer.

5. A composition of matter adapted to be mass polymerized to a transparent, colorless, color-stable polymer, consisting essentially of a monomeric α-halogen substituted acrylic acid ester, having dissolved therein from 0.1 to 5% of a chlorohydrin of a polyhydric alcohol of up to 3 carbon atoms, the amount of said chlorohydrin being insufficient to materially affect the physical characteristics of the polymer, but sufficient to prevent the formation of color in said polymer.

6. A composition of matter adapted to be mass polymerized to a transparent, colorless, color-stable polymer, consisting essentially of a methyl α-chloracrylate, having dissolved therein from 0.1 to 5% of an inorganic ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymer, but sufficient to prevent the formation of color in said polymer.

7. A composition of matter adapted to be mass polymerized to a transparent, colorless, color-stable polymer, consisting essentially of methyl α-chloracrylate, having dissolved therein from about 0.1 to about 5% of dipropyl sulfite.

8. A composition of matter adapted to be mass polymerized to a transparent, colorless, color-stable polymer, consisting essentially of methyl α-chloracrylate, having dissolved therein from about 0.1 to about 5% of glycol sulfite.

9. A composition of matter adapted to be mass polymerized to a transparent, colorless, color-stable polymer, consisting essentially of methyl α-chloracrylate, having dissolved therein from about 0.1 to about 5% of ethylene chlorohydrin.

10. A method for the production of transparent, colorless, color-stable mass polymers of α-haloacrylic acid derivatives which comprises subjecting to polymerizing influences, in mass polymerization, a composition consisting essentially of a polymerizable monomeric α-halogen substituted acrylic acid derivative, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymers but sufficient to prevent the formation of color in said polymers.

11. A transparent, color-free color-stable mass polymer from a composition consisting essentially of a polymerizable monomeric α-halogen substituted acrylic acid derivative, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said ester being insufficient to materially affect the physical characteristics of the polymer but sufficient to prevent the formation of color in said polymer.

12. A transparent, color-free, color-stable mass polymer from a composition consisting essentially of methyl α-chloracrylate, having dissolved therein from 0.1 to 5% of dipropyl sulfite, the amount of dipropyl sulfite being insufficient to materially affect the physical characteristics of the polymer but sufficient to prevent the formation of color in said polymer.

13. A transparent, color-free, color-stable mass polymer from a composition consisting essentially of methyl α-chloracrylate, having dissolved therein from 0.1 to 5% of glycol sulfite, the amount of glycol sulfite being insufficient to materially affect the physical characteristics of the polymer but sufficient to prevent the formation of color in said polymer.

14. A transparent color-free, color-stable mass polymer from a composition consisting essentially of methyl-alpha-chloracrylate, having dissolved therein from 0.1 to 5% of ethylene chlorohydrin, the amount of ethylene chlorohydrin being insufficient to materially affect the physical characteristics of the polymer but sufficient to prevent the formation of color in said polymer.

15. A method for the production of transparent, colorless, color-stable mass polymers of alpha-haloacrylic acid esters, which comprises subjecting to polymerizing influences, in mass polymerization, a composition consisting essentially of a polymerizable monomeric alpha-halogen substituted acrylic acid ester, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymer, but sufficient to prevent the formation of color in said polymer.

16. A method for the production of transparent, colorless, color-stable mass polymers of methyl-alpha-chloracrylate, which comprises subjecting to polymerizing influences, in mass polymerization, a composition consisting essentially of monomeric methyl-alpha-chloracrylate, having dissolved therein from 0.1 to 5% of an inorganic acid ester of a saturated alcohol of up to 3 carbon atoms, of the class consisting of sulfites, sulfates, borates, hypochlorites, chlorohydrins and bromohydrins, the amount of said inorganic acid ester being insufficient to materially affect the physical characteristics of the polymer, but sufficient to prevent the formation of color in said polymer.

17. A method for the production of transparent, colorless, color-stable mass polymers of alpha-haloacrylic acid esters, which comprises subjecting to polymerizing influences, in mass polymerization, a composition consisting essentially of a polymerizable monomeric alpha-halogen substituted acrylic acid ester, having dissolved therein from 0.1 to 5% of a sulfite ester of a saturated monohydric alcohol of up to 3 carbon atoms, the amount of said sulfite ester being insufficient to materially affect the physical characteristics of the polymer, but sufficient to prevent the formation of color in said polymer.

18. A method for the production of transparent, colorless, color-stable mass polymers of alpha-haloacrylic acid esters, which comprises subjecting to polymerizing influences, in mass polymerization, a composition consisting essentially of a polymerizable monomeric alpha-halogen substituted acrylic acid ester, having dissolved therein from 0.1 to 5% of a sulfite ester of a saturated polyhydric alcohol of up to 3 carbon atoms, the amount of said sulfite ester being insufficient to materially affect the physical characteristics of the polymer, but sufficient to prevent the formation of color in said polymer.

19. A method for the production of transparent, colorless, color-stable mass polymers of alpha-haloacrylic acid esters, which comprises subjecting to polymerizing influences, in mass polymerization, a composition consisting essentially of a polymerizable monomeric alpha-halogen substituted acrylic acid ester, having dissolved therein from 0.1 to 5% of a chlorohydrin of a saturated polyhydric alcohol of up to 3 carbon atoms, the amount of said chlorohydrin being insufficient to materially affect the physical characteristics of the polymer, but sufficient to prevent the formation of color in said polymer.

20. A method for the production of transparent, colorless, color-stable mass polymers of methyl-alpha-chloracrylate, which comprises subjecting to polymerizing influences, in mass polymerization, a composition consisting essentially of monomeric methyl-alpha-chloracrylate, having dissolved therein from 0.1 to 5% of dipropyl sulfite.

21. A method for the production of transparent, colorless, color-stable mass polymers of methyl-alpha-chloracrylate, which comprises subjecting to polymerizing influences, in mass polymerization, a composition consisting essentially of monomeric methyl-alpha-chloracrylate, having dissolved therein from 0.1 to 5% of glycol sulfite.

22. A method for the production of transparent, colorless, color-stable mass polymers of methyl-alpha-chloracrylate, which comprises subjecting to polymerizing influences, in mass polymerization, a composition consisting essentially of monomeric methyl-alpha-chloracrylate, having dissolved therein from 0.1 to 5% of ethylene chlorohydrin.

CARL E. BARNES.
WILLIAM O. NEY, JR.

REFERENCES CITED

The following references are of record in the file of this patent:

UNITED STATES PATENTS

| Number | Name | Date |
|---|---|---|
| 2,282,088 | Pollack | May 5, 1942 |
| 2,308,236 | Pollack et al. | Jan. 12, 1943 |
| 2,318,959 | Muskat et al. | May 11, 1943 |
| 2,429,018 | D'Ianni | Oct. 14, 1947 |

OTHER REFERENCES

Wertheim: "Textbook of Organic Chemistry," 2nd ed. (1945), page 102.